US011883963B2

(12) United States Patent
Tan et al.

(10) Patent No.: US 11,883,963 B2
(45) Date of Patent: Jan. 30, 2024

(54) ROBOTIC PLATFORM FOR INTERACTIVE PLAY USING A TELEPRESENCE ROBOT SURROGATE

(71) Applicant: Cushybots Corporation, Havertown, PA (US)

(72) Inventors: Allen Dodgson Tan, Long Beach, CA (US); John A Wright, Phnom Penh (KH); Garrett M Clayton, Havertown, PA (US); Porhour Ly, Phnom Penh (KH)

(73) Assignee: Cushybots Corporation, Havertown, PA (US)

( * ) Notice: Subject to any disclaimer, the term of this patent is extended or adjusted under 35 U.S.C. 154(b) by 437 days.

(21) Appl. No.: 16/892,099

(22) Filed: Jun. 3, 2020

(65) Prior Publication Data

US 2020/0398432 A1    Dec. 24, 2020

Related U.S. Application Data

(60) Provisional application No. 62/856,522, filed on Jun. 3, 2019.

(51) Int. Cl.
| | | |
|---|---|---|
| *B25J 11/00* | (2006.01) | |
| *B25J 9/16* | (2006.01) | |
| *B25J 9/00* | (2006.01) | |
| *B25J 19/02* | (2006.01) | |

(52) U.S. Cl.
CPC .......... *B25J 9/1689* (2013.01); *B25J 9/0081* (2013.01); *B25J 11/001* (2013.01); *B25J 11/003* (2013.01); *B25J 11/0015* (2013.01); *B25J 19/023* (2013.01)

(58) Field of Classification Search
CPC ...... B25J 9/1689; B25J 9/0081; B25J 11/001; B25J 11/0015; B25J 11/003; B25J 19/023; B25J 13/02; B25J 19/00
USPC ........................................................ 700/259
See application file for complete search history.

(56) References Cited

U.S. PATENT DOCUMENTS

| | | | |
|---|---|---|---|
| 4,665,640 A | 5/1987 | Forsse et al. | |
| 6,016,385 A * | 1/2000 | Yee ............................ | B25J 3/04 |
| | | | 446/329 |
| 6,149,490 A | 11/2000 | Hampton et al. | |
| 7,062,073 B1 | 6/2006 | Tumey et al. | |
| 7,720,572 B2 | 5/2010 | Ziegler et al. | |
| 9,492,922 B1 * | 11/2016 | Johnson ................... | B25J 9/161 |
| 9,753,453 B2 * | 9/2017 | Benaim ................... | G06F 30/00 |
| 9,902,061 B1 * | 2/2018 | Kuffner ................... | B25J 9/1674 |
| 9,987,749 B2 | 6/2018 | Nagendran et al. | |
| 11,198,221 B2 * | 12/2021 | Hayashi ................... | A63H 3/28 |
| 11,325,260 B2 * | 5/2022 | Yeo .......................... | B25J 13/06 |
| 2003/0146898 A1 * | 8/2003 | Kawasaki .............. | B25J 13/081 |
| | | | 345/156 |

(Continued)

FOREIGN PATENT DOCUMENTS

WO    WO-2010136427 A1 * 12/2010 ............ B25J 9/1661

*Primary Examiner* — B M M Hannan
(74) *Attorney, Agent, or Firm* — Armstrong Teasdale LLP

(57) ABSTRACT

A robotic platform associated with one or more software services enables remote users to interact with an environment and other humans physically and visually through a robotic surrogate over any distance utilizing the internet. The robotic surrogate is controlled through a non-technical user interface which responds to user control inputs made through natural user arm movements which are tracked in three dimensional space.

9 Claims, 16 Drawing Sheets

(56) References Cited

U.S. PATENT DOCUMENTS

| | | | |
|---|---|---|---|
| 2005/0031166 A1* | 2/2005 | Fujimura | G06V 40/107 382/103 |
| 2008/0086236 A1* | 4/2008 | Saito | G05D 1/0251 901/1 |
| 2009/0055019 A1* | 2/2009 | Stiehl | B25J 9/1671 901/17 |
| 2011/0218674 A1* | 9/2011 | Stuart | H04N 23/64 700/259 |
| 2011/0288682 A1* | 11/2011 | Pinter | B25J 9/1689 700/259 |
| 2012/0072023 A1* | 3/2012 | Ota | B25J 9/1664 901/1 |
| 2012/0185094 A1* | 7/2012 | Rosenstein | G05D 1/0272 901/1 |
| 2012/0239196 A1* | 9/2012 | Olivier, III | G06F 3/012 901/1 |
| 2013/0158707 A1* | 6/2013 | Lee | G06N 5/02 901/46 |
| 2013/0345870 A1* | 12/2013 | Buehler | B25J 13/084 901/47 |
| 2014/0139616 A1* | 5/2014 | Pinter | A61B 5/02055 348/14.08 |
| 2015/0094851 A1* | 4/2015 | Kawabe | G05D 1/0251 901/1 |
| 2015/0290795 A1* | 10/2015 | Oleynik | B25J 9/0081 700/257 |
| 2016/0046023 A1* | 2/2016 | Nagendran | B25J 9/1605 700/258 |
| 2016/0151909 A1* | 6/2016 | Hardouin | B25J 9/08 700/245 |
| 2017/0225336 A1* | 8/2017 | Deyle | B25J 5/007 |
| 2017/0266812 A1* | 9/2017 | Thapliya | B25J 9/0003 |
| 2019/0077007 A1* | 3/2019 | Mallinson | G05D 1/0094 |
| 2019/0184572 A1* | 6/2019 | Hayashi | B25J 13/08 |
| 2019/0266746 A1* | 8/2019 | Murrish | G06F 3/011 |
| 2019/0291277 A1* | 9/2019 | Oleynik | B25J 9/1697 |
| 2020/0070343 A1* | 3/2020 | Thomaz | B25J 9/163 |
| 2020/0114521 A1* | 4/2020 | Mahoor | G06F 3/147 |
| 2020/0130194 A1* | 4/2020 | Yamamoto | G05D 1/0016 |
| 2020/0238529 A1* | 7/2020 | Hiruta | B25J 13/00 |
| 2020/0368616 A1* | 11/2020 | Delamont | A63F 13/213 |
| 2021/0104213 A1* | 4/2021 | Furuya | G10G 1/00 |
| 2021/0170585 A1* | 6/2021 | Kim | G06N 20/00 |

* cited by examiner

Robotic Platform

ROBOTIC PLATFORM FOR INTERACTIVE PLAY USING A TELEPRESENCE ROBOT SURROGATE

CROSS-REFERENCE TO RELATED APPLICATION

This application claims the benefit of U.S. Provisional Patent Application No. 62/856,522, filed Jun. 3, 2019, which is incorporated by reference in its entirety.

FIELD OF THE INVENTION

The present invention relates to a robotic platform and associated software services, and, more particularly, a robotics platform for enabling remote users to interact with an environment physically and visually through a remotely located robotic surrogate.

BACKGROUND

Humankind is moving towards a future where we can be virtually present anywhere. As humans, we will always want and need a physical interface with the world and with each other. Families do not live in as close proximity to each other nowadays like they did only 100 years ago. Now, many extended families live apart from each other among different states, and in some cases different countries. This causes some parents and grandparents, or other family members, who live far away from their extended family to miss out on natural play experiences critical for good communication, intimacy, and bonding. Further, play experiences for young children are vital for developing their motor and communication skills, as well as stoking their creativity.

So-called telepresence robots of today lack any type of mobility with respect to arm or appendage movements and are merely a tablet with wheels. Further, current solutions lack safety measures to protect those that interact with the telepresence robots, such as young children, or the like.

What is needed is a platform which enables safe remote human-to-human physical interaction through robotic surrogates, or avatars.

BRIEF SUMMARY OF THE INVENTION

A system, method, and apparatus comprising multiple software systems is disclosed. In a first embodiment, systems may provide a robotic platform having associated software services which enables remote users to interact with an environment and other humans physically and visually through a robotic surrogate over a long distance, such as via a network (i.e. the internet). The robotic surrogate may be controlled by a user interface configured to receive user control inputs. The robotic surrogate may be operable to move in response to the inputs and commands. Typical movements may include moving around the room, adjusting the robotic surrogate's height, or the like. User control inputs may be tracked in three dimensional space using, for example, by one or more sensors, such as motion tracking handheld controllers, camera inputs, or the like.

In a second embodiment, the systems may serve to relay video to and from a robot device and send commands to the robot device which actuate physical movements of the robot device. Further, the servers may be enabled to receive one or more feedback signals/messages from the robot device. The received feedback may be displayed on a screen associated with a user having authorized control. Appropriate security protocols may be utilized to ensure user account management and security.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Figure 1:
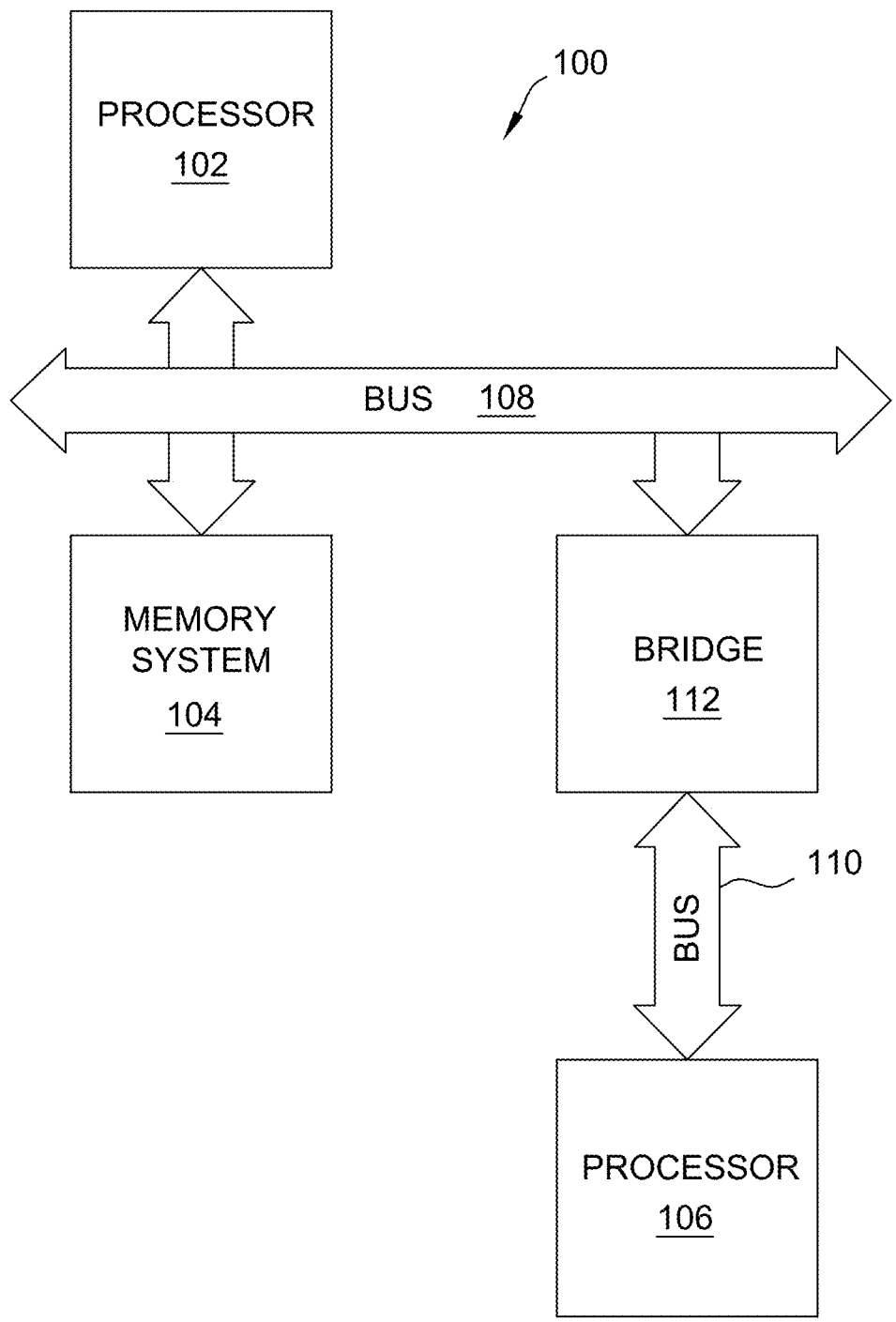
FIG. 1 is a simplified functional block diagram of a computer system in accordance with the embodiments of the disclosed invention.

FIG. 1 is an example of a simplified functional block diagram of a computer system 100. The functional descriptions of the present invention can be implemented in hardware, software or some combination thereof.

As shown in FIG. 1, the computer system 100 includes a processor 102, a memory system 104 and one or more input/output (I/O) devices 106 in communication by a communication 'fabric'. The communication fabric can be implemented in a variety of ways and may include one or more computer buses 108, 110 and/or bridge and/or router devices 112 as shown in FIG. 1. The I/O devices 106 can include network adapters and/or mass storage devices from which the computer system 100 can send and receive data, such as video streaming data, computer instructions, commands, or the like. The computer system 100 may be in communication with the Internet via the I/O devices 108.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

The various illustrative logics, logical blocks, modules, and engines, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

Figure 2:
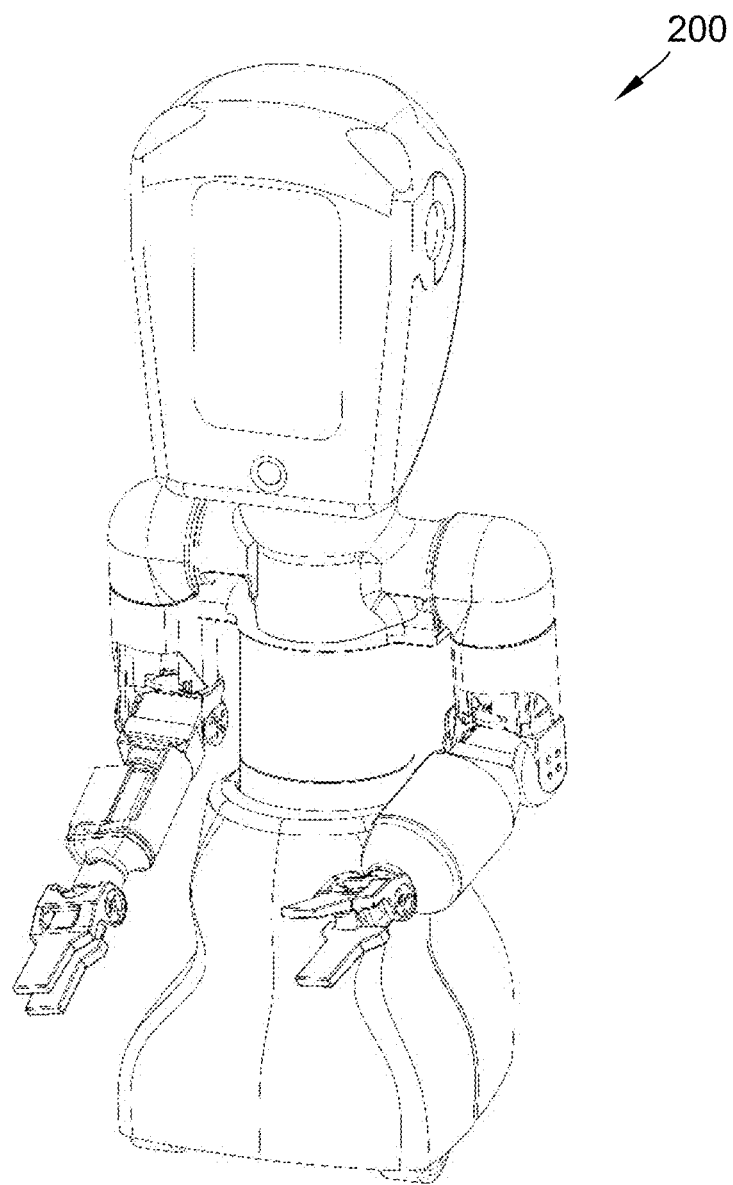
FIG. 2 illustrates an example robotic surrogate in accordance with at least one embodiment of the disclosed invention.
Figure 3:
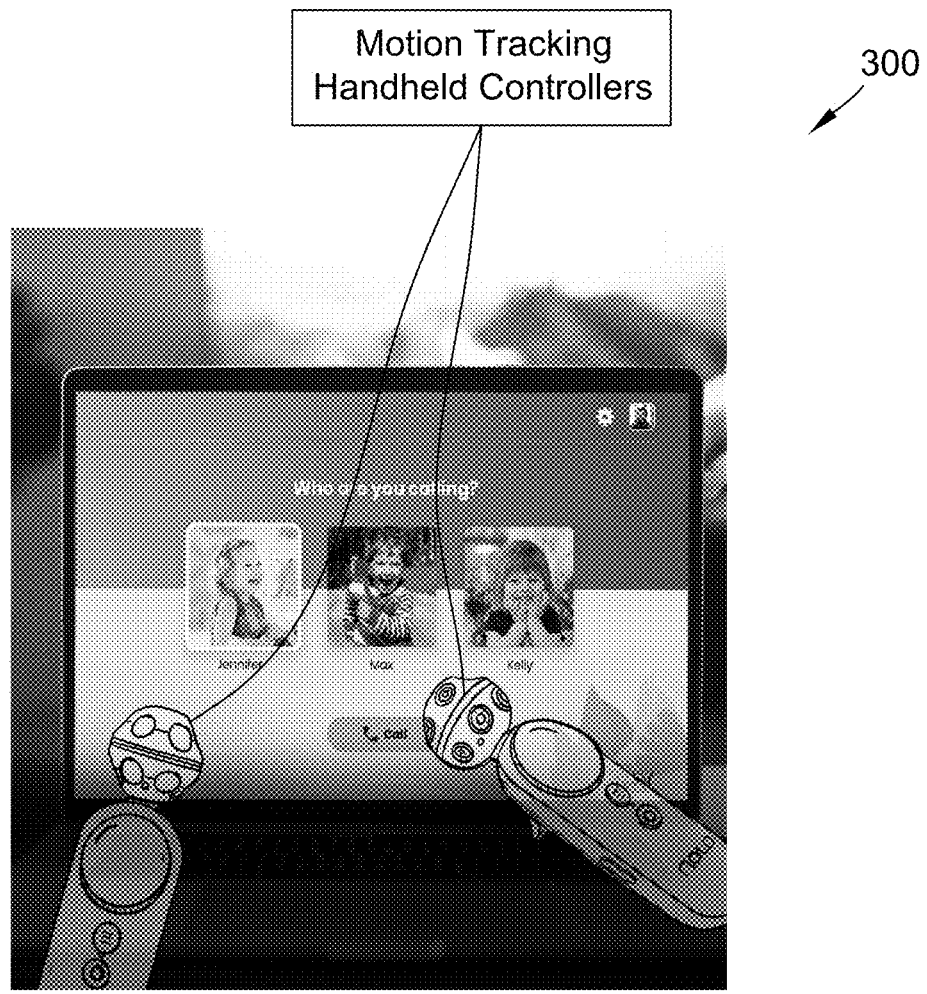
FIG. 3 illustrates an example user control interface in accordance with at least one embodiment of the disclosed invention.

FIGS. 2 and 3 illustrate an example robotic surrogate 200 and a user control interface 300. The platform may include at least one robotic platform and one or more associated software services. The platform and software services may enable one or more remote users to interact with an environment, such as objects in a room, via remote control. Additionally, or alternatively, the platform and software services may enable one or more remote users to interact with other users physically and/or visually. For example, a certain user may be within the same room as the robotic surrogate, such as robotic surrogate 200, and a remote user may be located a certain distance away, such as in a different room, or even further, such as in another state or even another country. In some embodiments, the remote user may control the robotic surrogate from a far distance via a network connection, such as an Internet connection. In some embodiments, the remote user may control robotic surrogate 200 via a non-technical user interface, such as the example interface shown in FIG. 3. The remote user may control the robotic surrogate 200 by issuing one or more commands via the user interface. Additionally, or alternatively, the user may control the robotic surrogate using one or more handheld motion tracking controllers.

The computing device of the remote user may comprise of one or more sensors that may track one or more handheld motion tracking controllers, or other types of movement sensors that may track a user's natural movements in space. For example, in one embodiment, user control inputs made through natural user arm movements may be tracked in three dimensional space.

Figure 4:
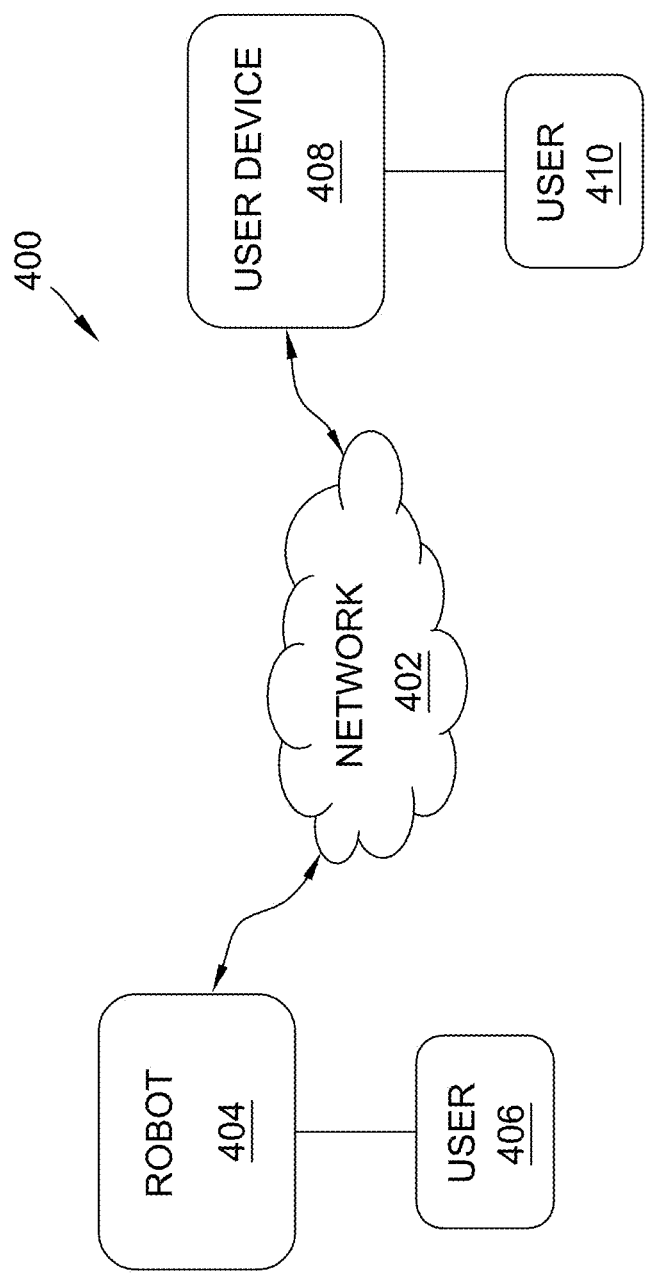
FIG. 4 illustrates an example networked diagram of one or more devices in accordance with at least one embodiment of the disclosed invention.

FIG. 4 illustrates an example network diagram 400 of the remote control platform. In at least one embodiment, robot 404 may be associated with a local user, such as user 406. It is understood that robot 404 may be associated with more than one user, such as a group of users. Robot 404 may be the robotic surrogate shown in FIG. 2, for example. The robot 404 may be communicatively-connected to a user device, such as user device 408, via network 402. A remote user, such as user 410, may be associated with user device 408. User 410, in at least one embodiment, may interact with a user interface of user device 408 to issue commands and control robot 404 via network 402. For example, user 410 may use one or more motion tracking controllers to convey movements to be enacted by robot 404 in order for user 410 to interact with user 406. In some embodiments, network 402 may be a local area network, a virtual private network, a wide area network, a personal area network, the Internet, or the like. The type of network is not meant to be limiting. User device 408 may include one or more sensors to track movements made by user 410. User 410 may additionally have one or more sensors that are tracked, such as by using one or more handheld controllers. Sensed movements of user 410 by device 408 may cause one or more instructions to be sent to robot device 404 via network 402. The instructions may subsequently cause robot 404 to move and interact with user 406. Additionally, or alternatively, the sensors of user device 408 may be one or more cameras configured to capture movements of user 410. Even further, one or more sensors and/or cameras may be configured to capture facial expressions of user 410.

One or more disclosed embodiments provide a robotic platform enabling remote play, such as over a network or from a distance. In one embodiment, a user may control robotic movements via an interface local to the robot, such as in the same room as the robot, or via a local area network. In another embodiment, the user may control the robot from a distance, such as via a wide area network, or via the Internet. The disclosed robotic platform may provide a robotic surrogate having controllable arms with hands, or pincers that can pick up objects, such as toy blocks, or the like. Movements may be tracked of a remote user via a non-technical user interface utilizing virtual reality style natural movement motion tracking devices. An exemplary tracking device could be a Nolo VR® device, for example. It is understood that the disclosed is not limited to the usage of a Nolo VR® device. The robotic platform may further include an artificial intelligence (AI) user drive and control assistance in combination with one or more movement scripts to make complex movement effortless. The robot itself of the platform may be configured to include appropriate lighting and a body that is specially designed for play or other like activities that are created with safety in mind. Further, the robot platform may utilize lightning fast video feeds and other controls.

In some embodiments, a robotic surrogate may be placed in a home. A user in a remote location, such as a parent or relative, may initiate a call with the robotic surrogate via a user interface utilizing one or more motion tracking devices. The remote user may then interact with another user, such as a child, via the robotic surrogate.

The robotics platform may be engineered to be safe around humans, including, but not limited to, young children, or the like. Robotic functions may be controlled by one or more sensor arrays in conjunction with AI to assist users in controlling the robotic functions. Functions may include preset/automated functions that are enacted via single button actuation. A control UI may be integrated with handheld motion tracking controllers, thereby creating an intuitive non-technical UI for all skill levels. Additionally, or alternatively, a low-latency server side software may relay video and control commands sent from a device associated with a remote user to the robotic surrogate. In some embodiments, a kinematic box on a server may enable the movements of the robotic surrogate.

The robotic surrogate, such as surrogate 200 of FIG. 2, may include one or more of a multicolor light array that expresses emotions, a live video feed that is automatically cropped around a face, a wide-angle high resolutions camera for full view of robot arms as well as the room, a washable suit that is soft to the touch, a sensor array to assist remote users in navigating without falling off ledges, down stairs, or the like, and dual arms having soft hands, or pincers, to pick up objects while simultaneously protecting a child, or other users, that may interact with the robotic surrogate. The robotic surrogate may also include a rechargeable battery (not shown) and one or more drive wheels. These disclosed features may be altered without altering the scope of the claimed invention.

Figure 5:
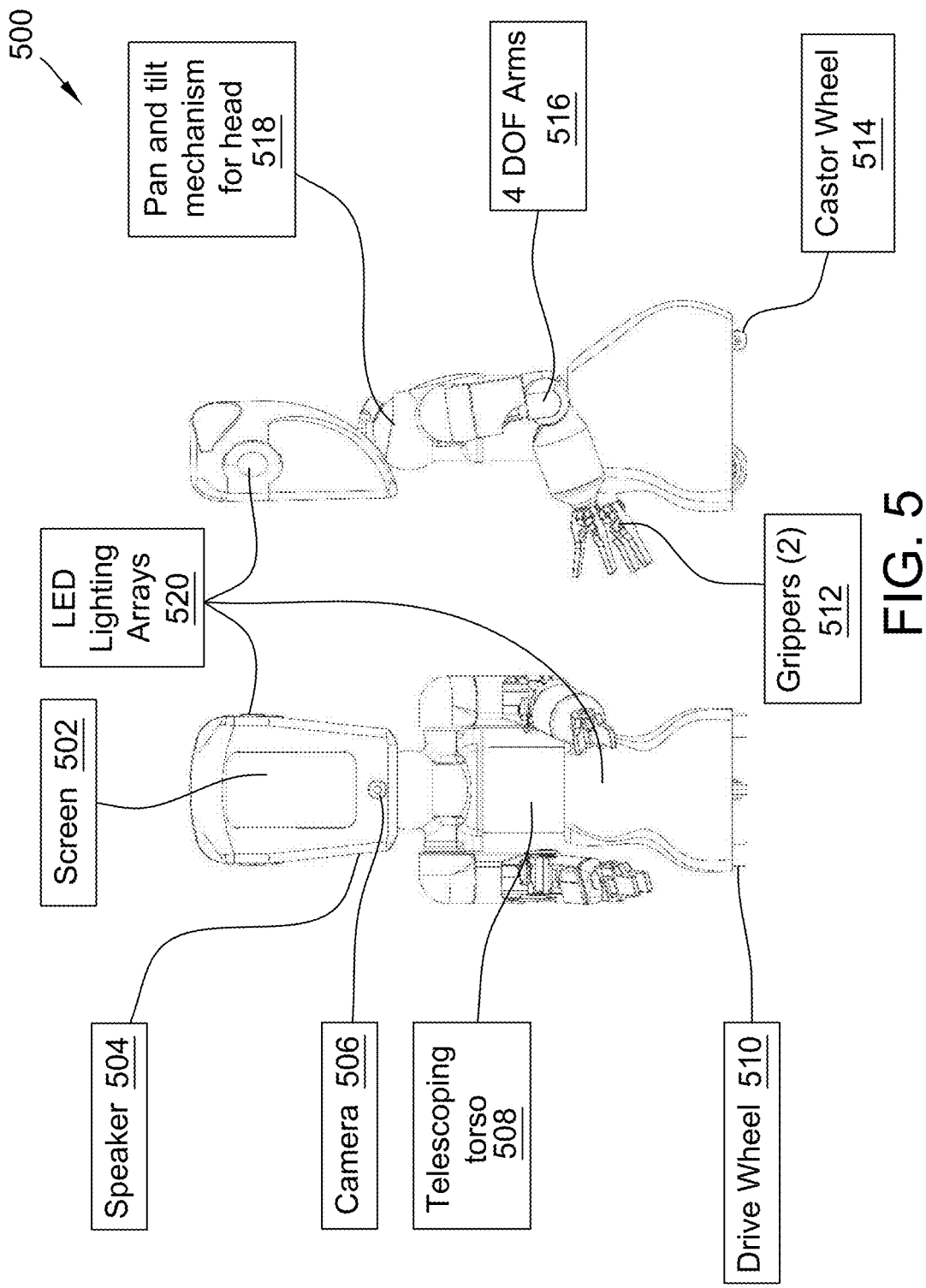
FIG. 5 illustrates an overall shape and configuration of an example robotic surrogate in accordance with at least one embodiment of the disclosed invention.

FIG. 5 illustrates an overall shape and configuration 500 of an example robotic surrogate in accordance with at least one embodiment. The example configuration may include a head holding a display screen 502, one or more speakers/ microphones 504, and one or more sensors, or cameras, 506. The robot head may also include one or more LED lighting arrays 520. The LED lighting arrays may be dual multicolor LED arrays installed on either side of the robot head, for example. In at least one embodiment, the robot head may be mounted on a two degree of freedom on a pan/tilt mount mechanism 518. The pan and tilt mechanism may include the use of two servos (not shown). The pan and tilt mechanism may allow for more than 45 degrees of rotation on an axis to move the head on a humanoid robot.

Configuration 500 may further include a telescoping torso 508. The torso 508 may enable the robot to alter the distance between the robot arms 516 and the ground. Arms 516 may each have four degrees freedom and may each have gripper hands 512. The arms 516 may be mounted on the torso 508. The arms may be equipped with pinch free joints. In some embodiments, the configuration 500 may include a drive system so the robot may move around. The drive system may be a three wheeled drive system, for example. The drive system may include two drive wheels 510 and a castor wheel 514. In at least one embodiment, the two drive wheels 510 may be powered and the castor wheel 514 may be a wheel that freely rotates.

Figure 6:
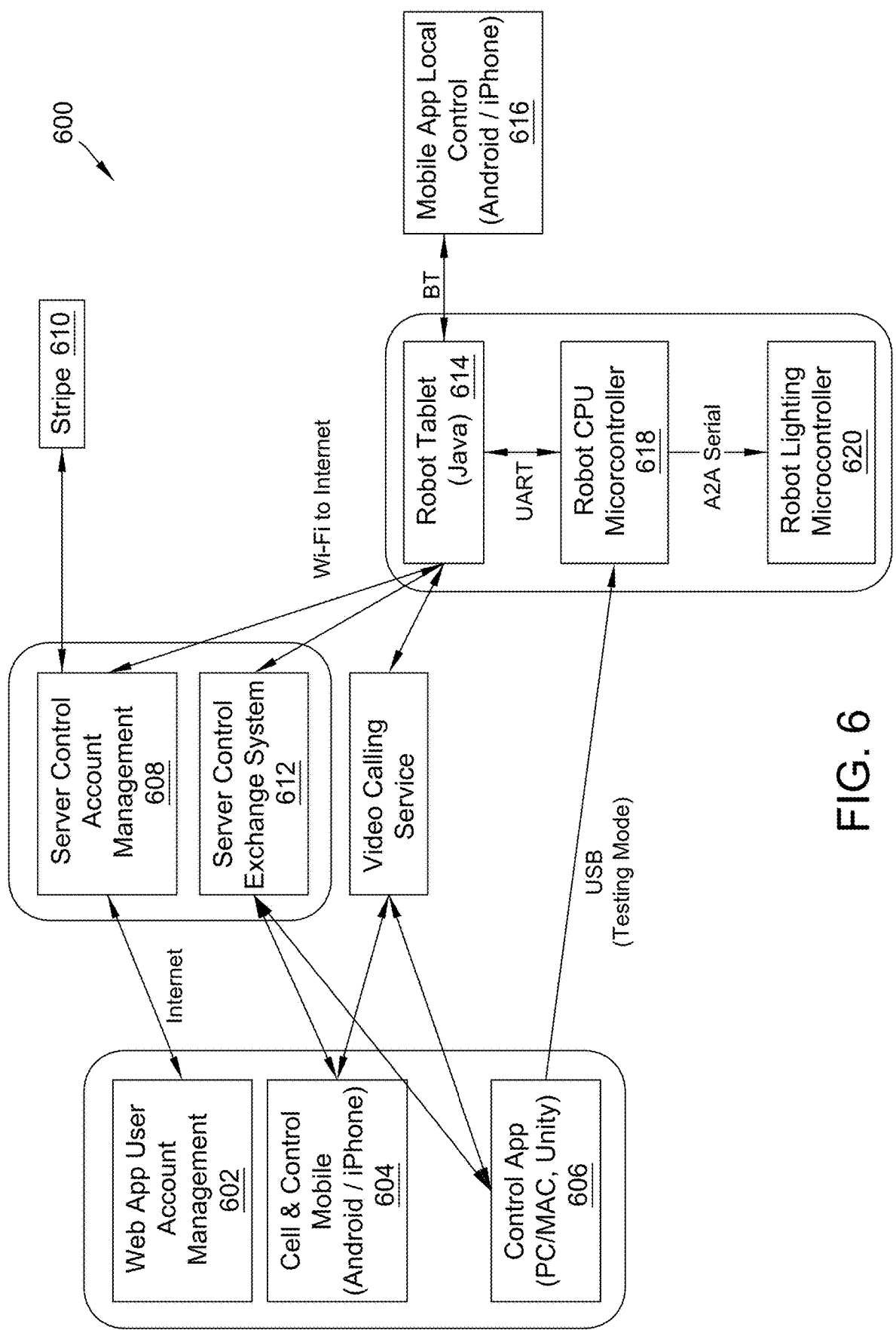
FIG. 6 illustrates multiple software systems in accordance with at least one embodiment of the disclosed invention.

The configurations set forth herein may include a system consisting of multiple software systems that serve to relay video to and from the robot, send commands, or instructions, to the robot that cause the robot to actuate physical movements, and receive feedback about the robot status. The robot status may, in one example, be displayed on the control side to ensure user account management and security. In view of FIG. 6, call and control features 604 may be conducted via web app user management 602. In at least one embodiment, user management 602 may be handled by a server control management device 608 via stripe 610. A server control exchange system 612 may manage video calling via call and control 604, a control app 606, and a device of the robotic device 614. Device 614 may have mobile local control 616, a robot CPU microcontroller 618, and a robot lighting microcontroller 620. It is understood that the configurations set forth herein are merely to provide exemplary embodiments of the disclosed and not meant to be limiting.

Figure 7:
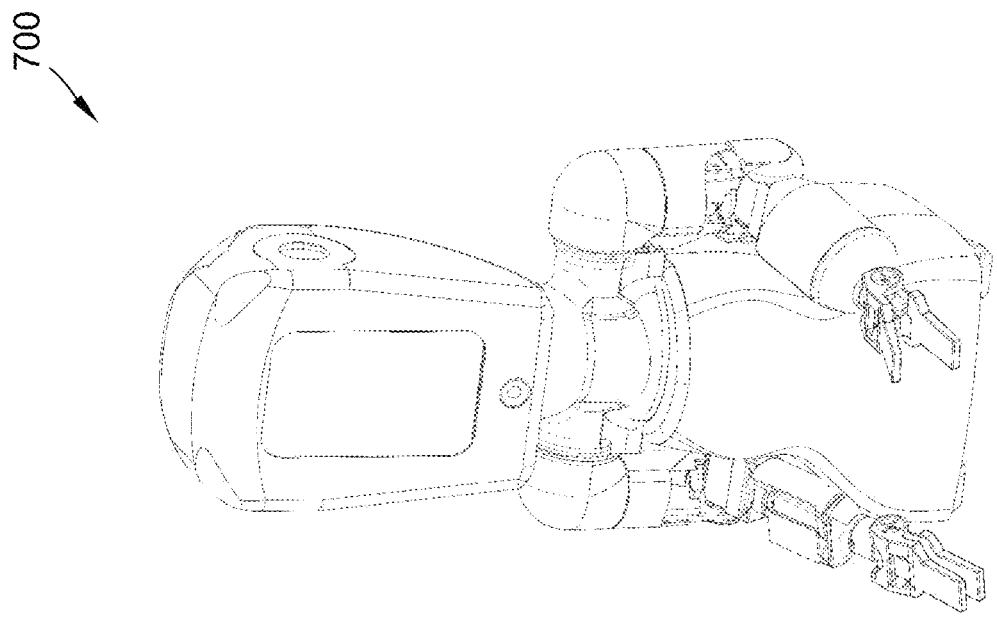
FIG. 7 illustrates a variable height mechanism of the robotic surrogate in accordance with at least one embodiment of the disclosed invention.
Figure 7:
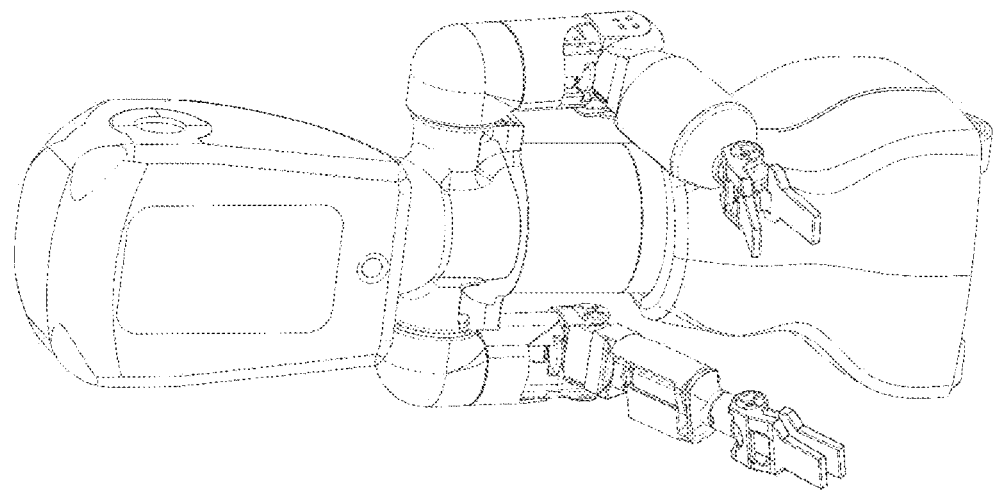

As shown in diagram 700 of FIG. 7, the robotic surrogate includes a mechanism for variable height. A robotics arm workspace may be changed based on the height of the robotic surrogate. In at least one example, a mechanism is provided as a part of the robot surrogate's torso. The mechanism may raise and lower the height of the robot, thereby changing the distance that the robotic arms are from the ground.

In accordance with the robotic device, the platform may further include a system which allows a user to augment the expression of human emotion using multiple light (e.g., LED) arrays. The arrays may be the arrays 520 of the robotic surrogate shown in FIG. 5, for example. In at least one embodiment, the properties of light emitted by the light arrays may change. Properties may include one or more of patterns, color, intensity, movement, or combinations thereof. In at least one example embodiment, the system may augment a remote user's ability to express their emotions in a way readily recognizable to one or more users that are communicating with the remote user via the robotic surrogate. LED light arrays provide a further expression of body language where shortcomings of video chat exist. For example, video chat may lack the ability to effectively express body language.

Figure 8:
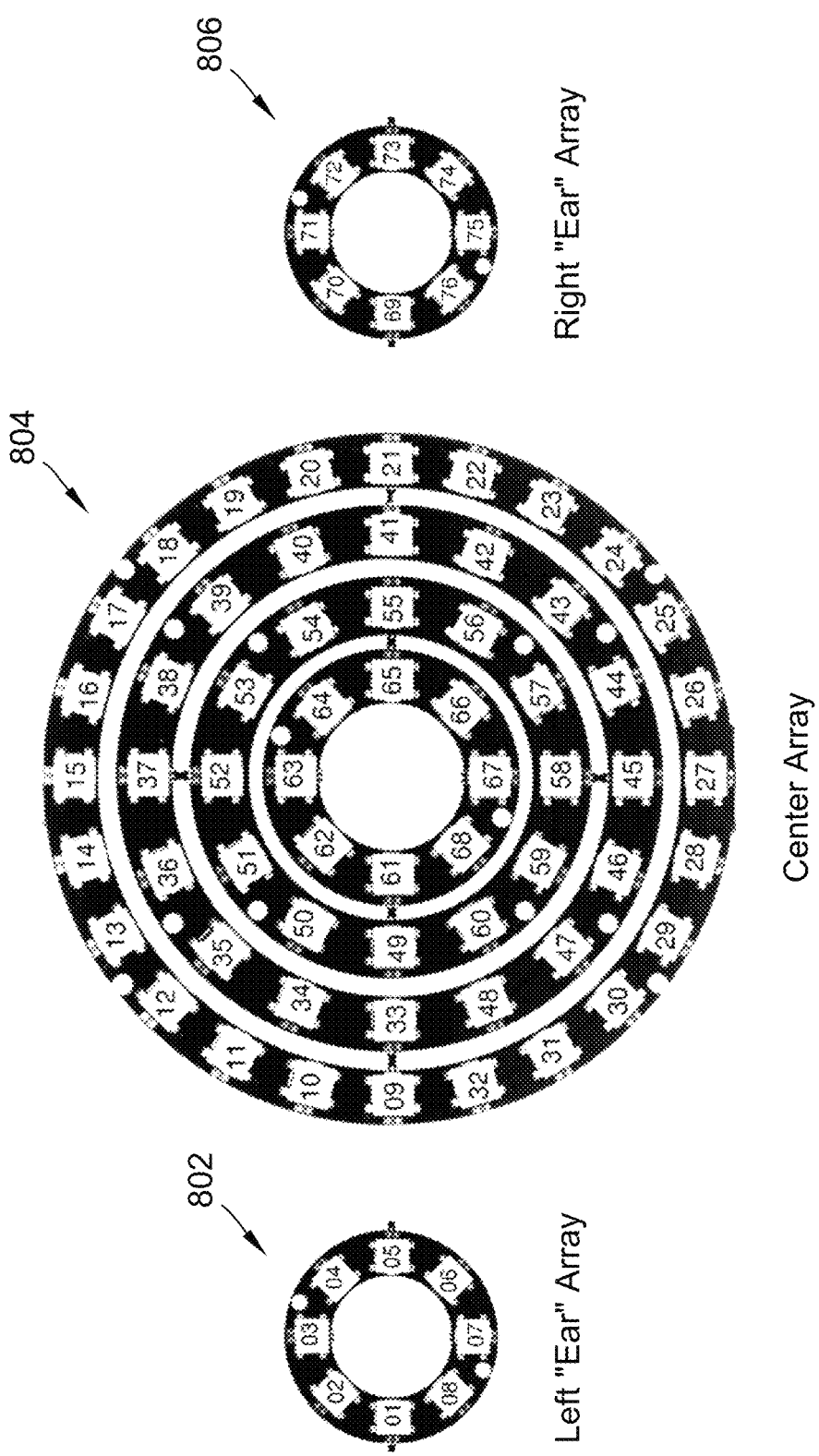
FIG. 8 illustrates an LED lighting array of at least one embodiment of the disclosed invention.

As illustrated in FIG. 8, different arrays of expressive lighting may be installed on different portions of a robotic surrogate. For example, the expressive lighting may include 76 multicolor light emitting diodes (LEDs). Each of the LEDs may change color and/or brightness. In an exemplary embodiment, a first array 802 may be installed on the left side of the robotic head, a second array 804 may be installed on the front of the robotic surrogate's torso, and a third array 806 may be installed on the right side of the robotic head. The robotic surrogate may include different arrangements of expressive lighting arrays within the spirit and scope of the disclosed. In some embodiments, the LED array may be responsive to music.

Figure 9:
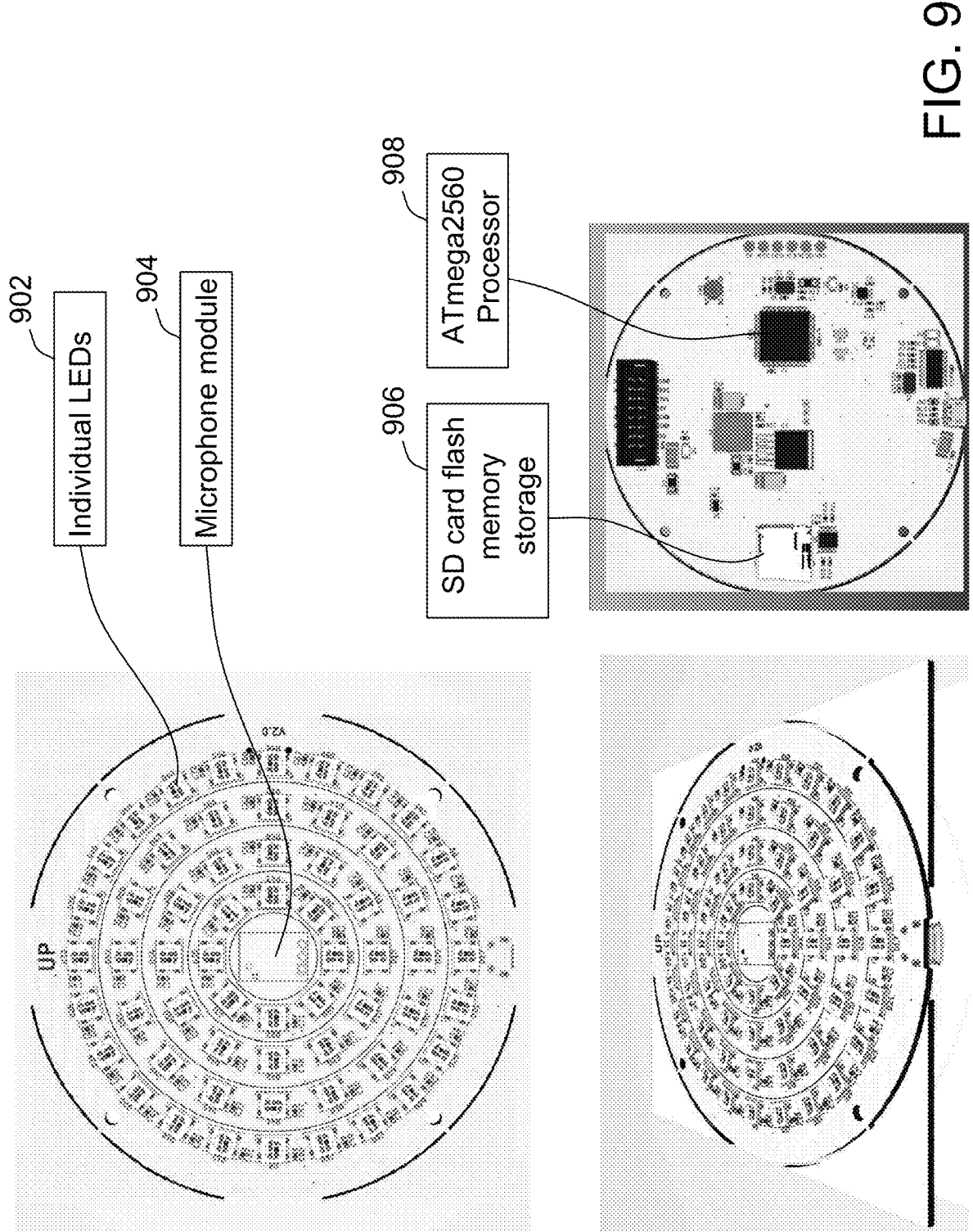
FIG. 9 provides an illustration of an LED lighting array construction in accordance with at least one embodiment of the disclosed invention.
Figure 10:
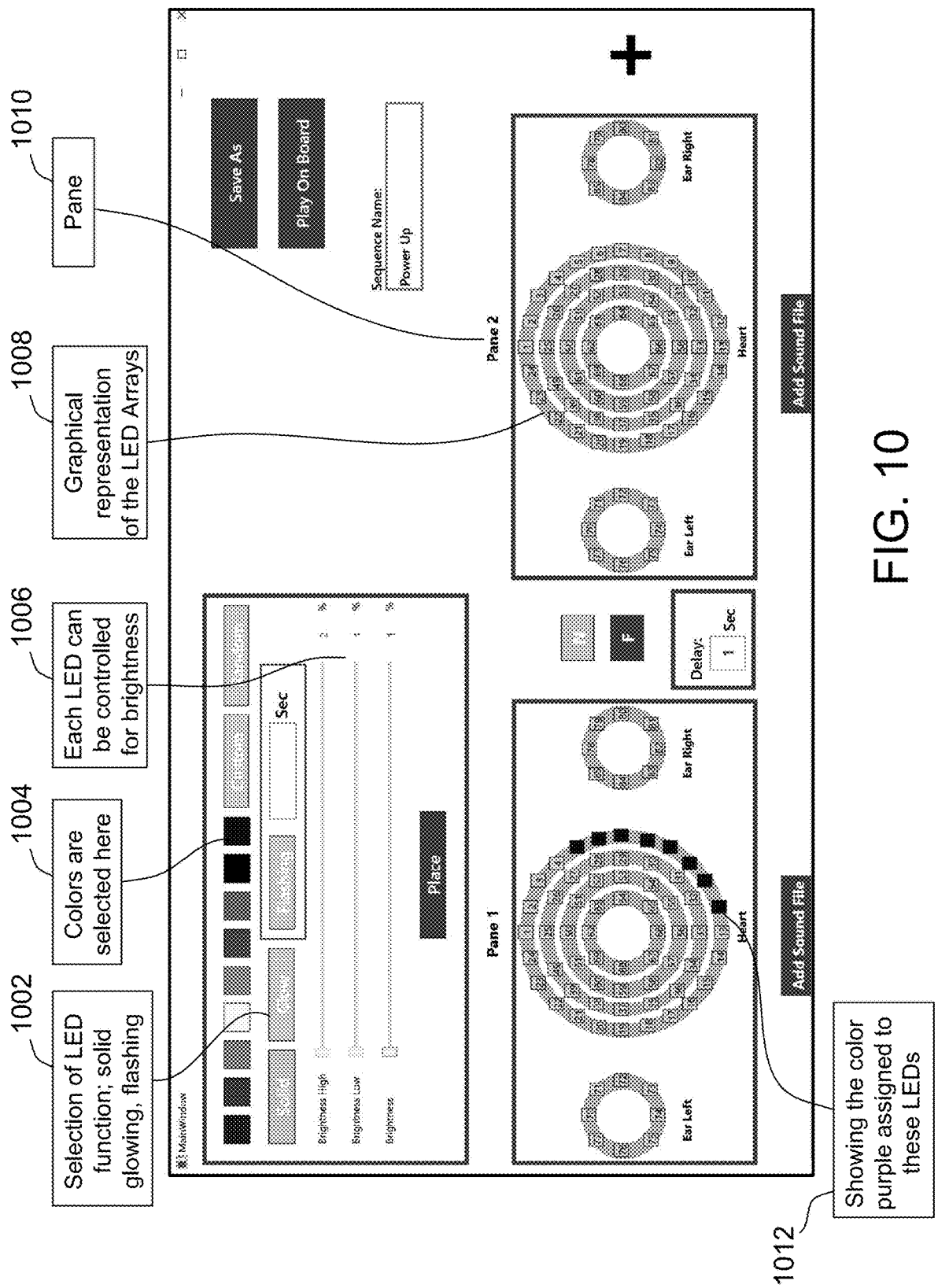
FIG. 10 illustrates a software user interface of at least one embodiment of the disclosed invention.

FIG. 9 provides an illustration of an LED lighting array construction in accordance with at least one embodiment of the disclosed. As shown in FIG. 9, a microphone module and microprocessor 904 may be integrated together with a main LED array 902. The construction may include an SD card flash memory storage 906 and a processor 908. A software application may be implemented and configured to build one or more lighting scripts which may control the LED arrays, such as the three LED arrays shown in FIG. 8. The software application, shown in exemplary FIG. 10, may be shown graphically to allow users to select colors 1004 and assign the selected colors to certain LEDs within the array. Users may be given the option to select LED functions 1002, such as solid, glowing, or flashing, LED colors, and brightness 1006. Graphical representations of the arrays 1008 may be shown in different panes 1010. Further, different selected colors may be shown 1012. Each pane, such as Pane 1 and Pane 2 of FIG. 10, may represent a snapshot of what array will display which LEDs for a given period. Additionally, or alternatively, animations may be created by sequencing the panes. It is understood that more than two panes may be created. Different time periods may be assigned to the delay between LED lighting changes. For example, a 1 second delay may be set between a first and second pane. However, this value may be altered to be a different time value (e.g., 2 seconds, 3 seconds, etc.). Time between subsequent transitions may differ. For example, if a third pane exists, the delay between pane 1 and pane 2 may be different than the time delay between pane 2 and 3. In some embodiments, the time between panes may be the same. The scripts created by the software application to control the LED arrays may include a format for storing and reading commands to control an LED array. The scripts may be created using a custom software tool and read by a microprocessor (i.e. processor 908 of FIG. 9) to control the lighting arrays. The scripts may use the stored and read commands shown below in exemplary Table 1.

TABLE 1

| Parent | Attribute/Child | Type | Possible Values | Notes |
| --- | --- | --- | --- | --- |
| s | name | text | Sequence text name of sequence, example "Power Up" | This is the internal reference name of the sequence. The file name will default to this |
| p | n | boolean text | Pane number, 1-100, example "5" | This is an attribute which identifies the pane number |
| p | sf | text | Pane sound file, file name of associated file, example "laugh.wav" | This is the file name of the file that will play when the pane plays |
| l | n | Integer text | 1-85, example "45" | This is the LED to which the attributes are assigned. |
| l | cr | boolean text | LED Random Color, true/false, example "t" or "f" | If true is selected, the player will pick a random color when the script plays. |
| l | lc | text | LED Color, hex color code, example "0xFF9329". Not used if LED_Color_Random = "t" | This is the color that the LED will become when the script plays. |
| l | ls | text | LED State, solid, glowing, flashing: "s" or "g" or "f" | This is the behavior of the LED. |
| l | lbh | integer text | LED_BrightnessHigh 2-100, not less than or equal to the value of LED_BrightnessLow, example "55". Only used if LED_State="glow". If LED_State ≠ "glow" then this is set to "0" | When using the "glow" effect, this is the maximum brightness the LED will reach. |
| l | lbl | integer text | LED_BrightnessLow 1-99, not more than or equal to the value of LED_BrightnessHigh, example "45". Only used if LED_State = "glow". If LED_State ≠ "glow" then this is set to "0" | When using the "glow" effect, this is the minimum brightness the LED will reach. |
| l | lb | integer text | LED_Brightness 1-100. only used when LED_State = "s" or "f". If LED_State is set to "glow", this is set to "0" | When using the "flash" or "solid" effect, this is the brightness of the LED. |
| l | lfd | number text | LED Flash Delay .05-5, example "2.03". Only used if LED_State = "flash". | When using the "flash" effect, this is the time between LED flashes. |

TABLE 1-continued

| Parent | Attribute/Child | Type | Possible Values | Notes |
|---|---|---|---|---|
| t | f | boolean text | Transition Fade true/false, example "t" or "f" | This determines if the fade effect is used when transitioning between panes in the sequence. |
| t | d | boolean text | Transition Delay true/false. example "t" of "f" | This determines if there is a delay between panes in the sequence. |
| t | dt | number text | Transition Delay Time .05-5. example "2.03". | This determines the delay before one pane will transition to another in the sequence. |

A sample one pane script, which is not deemed to be limiting in any way:

```
<?xml version="1.0" encoding="UTF-8"?>
<s name="Power Up">
<p n="1" sf="laugh.wav">
<l n="1" cr="f" lc="OxFF9329" ls="flash" lbh="0" lbl="0" lb="10" lfd="15" >
<l n="2" cr="f" lc="OxFF9329" ls="flash" lbh="0" lbl="0" lb="10" lfd="15" >
<l n="3" cr="f" lc="OxFF9329" ls="flash" lbh="0" lbl="0" lb="10" lfd="15" >
<l n="4" cr="f" lc="OxFF9329" ls="flash" lbh="0" lbl="0" lb="10" lfd="15" >
<l n="5" cr="f" lc="OxFF9329" ls="flash" lbh="0" lbl="0" lb="10" lfd="15" >
<l n="6" cr="f" lc="OxFF9329" ls="flash" lbh="0" lbl="0" lb="10" lfd="15" >
<l n="7" cr="f" lc="OxFF9329" ls="flash" lbh="0" lbl="0" lb="10" lfd="15" >
<l n="8" cr="f" lc="OxFF9329" ls="flash" lbh="0" lbl="0" lb="10" lfd="15" >
<l n="9" cr="f" lc="OxFF9329" ls="flash" lbh="0" lbl="0" lb="10" lfd="15" >
<l n="10" cr="f" lc="OxFF9329" ls="flash" lbh="0" lbl="0" lb="10" lfd="15" >
<l n="11" cr="f" lc="OxFF9329" ls="flash" lbh="0" lbl="0" lb="10" lfd="15" >
<l n="12" cr="f" lc="OxFF9329" ls="flash" lbh="0" lbl="0" lb="10" lfd="15" >
<l n="13" cr="f" lc="OxFF9329" ls="flash" lbh="0" lbl="0" lb="10" lfd="15" >
<l n="14" cr="f" lc="OxFF9329" ls="flash" lbh="0" lbl="0" lb="10" lfd="15" >
<l n="15" cr="f" lc="OxFF9329" ls="flash" lbh="0" lbl="0" lb="10" lfd="15" >
<l n="16" cr="f" lc="OxFF9329" ls="flash" lbh="0" lbl="0" lb="10" lfd="15" >
<l n="17" cr="f" lc="OxFF9329" ls="flash" lbh="0" lbl="0" lb="10" lfd="15" >
<l n="18" cr="f" lc="OxFF9329" ls="flash" lbh="0" lbl="0" lb="10" lfd="15" >
<l n="19" cr="f" lc="OxFF9329" ls="flash" lbh="0" lbl="0" lb="10" lfd="15" >
<l n="20" cr="f" lc="OxFF9329" ls="flash" lbh="0" lbl="0" lb="10" lfd="15" >
<l n="21" cr="f" lc="OxFF9329" ls="flash" lbh="0" lbl="0" lb="10" lfd="15" >
<l n="22" cr="f" lc="OxFF9329" ls="flash" lbh="0" lbl="0" lb="10" lfd="15" >
<l n="23" cr="f" lc="OxFF9329" ls="flash" lbh="0" lbl="0" lb="10" lfd="15" >
<l n="24" cr="f" lc="OxFF9329" ls="flash" lbh="0" lbl="0" lb="10" lfd="15" >
<l n="25" cr="f" lc="OxFF9329" ls="flash" lbh="0" lbl="0" lb="10" lfd="15" >
<l n="26" cr="f" lc="OxFF9329" ls="flash" lbh="0" lbl="0" lb="10" lfd="15" >
<l n="27" cr="f" lc="OxFF9329" ls="flash" lbh="0" lbl="0" lb="10" lfd="15" >
<l n="28" cr="f" lc="OxFF9329" ls="flash" lbh="0" lbl="0" lb="10" lfd="15" >
<l n="29" cr="f" lc="OxFF9329" ls="flash" lbh="0" lbl="0" lb="10" lfd="15" >
<l n="30" cr="f" lc="OxFF9329" ls="flash" lbh="0" lbl="0" lb="10" lfd="15" >
<l n="31" cr="f" lc="OxFF9329" ls="flash" lbh="0" lbl="0" lb="10" lfd="15" >
<l n="32" cr="f" lc="OxFF9329" ls="flash" lbh="0" lbl="0" lb="10" lfd="15" >
<l n="33" cr="f" lc="OxFF9329" ls="flash" lbh="0" lbl="0" lb="10" lfd="15" >
<l n="34" cr="f" lc="OxFF9329" ls="flash" lbh="0" lbl="0" lb="10" lfd="15" >
<l n="35" cr="f" lc="OxFF9329" ls="flash" lbh="0" lbl="0" lb="10" lfd="15" >
<l n="36" cr="f" lc="OxFF9329" ls="flash" lbh="0" lbl="0" lb="10" lfd="15" >
<l n="37" cr="f" lc="OxFF9329" ls="flash" lbh="0" lbl="0" lb="10" lfd="15" >
<l n="38" cr="f" lc="OxFF9329" ls="flash" lbh="0" lbl="0" lb="10" lfd="15" >
<l n="39" cr="f" lc="OxFF9329" ls="flash" lbh="0" lbl="0" lb="10" lfd="15" >
<l n="40" cr="f" lc="OxFF9329" ls="flash" lbh="0" lbl="0" lb="10" lfd="15" >
<l n="41" cr="f" lc="OxFF9329" ls="flash" lbh="0" lbl="0" lb="10" lfd="15" >
<l n="42" cr="f" lc="OxFF9329" ls="flash" lbh="0" lbl="0" lb="10" lfd="15" >
<l n="43" cr="f" lc="OxFF9329" ls="flash" lbh="0" lbl="0" lb="10" lfd="15" >
<l n="44" cr="f" lc="OxFF9329" ls="flash" lbh="0" lbl="0" lb="10" lfd="15" >
<l n="45" cr="f" lc="OxFF9329" ls="flash" lbh="0" lbl="0" lb="10" lfd="15" >
<l n="46" cr="f" lc="OxFF9329" ls="flash" lbh="0" lbl="0" lb="10" lfd="15" >
<l n="47" cr="f" lc="OxFF9329" ls="flash" lbh="0" lbl="0" lb="10" lfd="15" >
<l n="48" cr="f" lc="OxFF9329" ls="flash" lbh="0" lbl="0" lb="10" lfd="15" >
<l n="49" cr="f" lc="OxFF9329" ls="flash" lbh="0" lbl="0" lb="10" lfd="15" >
<l n="50" cr="f" lc="OxFF9329" ls="flash" lbh="0" lbl="0" lb="10" lfd="15" >
<l n="51" cr="f" lc="OxFF9329" ls="flash" lbh="0" lbl="0" lb="10" lfd="15" >
<l n="52" cr="f" lc="OxFF9329" ls="flash" lbh="0" lbl="0" lb="10" lfd="15" >
<l n="53" cr="f" lc="OxFF9329" ls="flash" lbh="0" lbl="0" lb="10" lfd="15" >
<l n="54" cr="f" lc="OxFF9329" ls="flash" lbh="0" lbl="0" lb="10" lfd="15" >
<l n="55" cr="f" lc="OxFF9329" ls="flash" lbh="0" lbl="0" lb="10" lfd="15" >
```

-continued

```
<l n="56" cr="f" lc="0xFF9329" ls="flash" lbh="0" lbl="0" lb="10" lfd="15" >
<l n="57" cr="f" lc="0xFF9329" ls="flash" lbh="0" lbl="0" lb="10" lfd="15" >
<l n="58" cr="f" lc="0xFF9329" ls="flash" lbh="0" lbl="0" lb="10" lfd="15" >
<l n="59" cr="f" lc="0xFF9329" ls="flash" lbh="0" lbl="0" lb="10" lfd="15" >
<l n="60" cr="f" lc="0xFF9329" ls="flash" lbh="0" lbl="0" lb="10" lfd="15" >
<l n="61" cr="f" lc="0xFF9329" ls="flash" lbh="0" lbl="0" lb="10" lfd="15" >
<l n="62" cr="f" lc="0xFF9329" ls="flash" lbh="0" lbl="0" lb="10" lfd="15" >
<l n="63" cr="f" lc="0xFF9329" ls="flash" lbh="0" lbl="0" lb="10" lfd="15" >
<l n="64" cr="f" lc="0xFF9329" ls="flash" lbh="0" lbl="0" lb="10" lfd="15" >
<l n="65" cr="f" lc="0xFF9329" ls="flash" lbh="0" lbl="0" lb="10" lfd="15" >
<l n="66" cr="f" lc="0xFF9329" ls="flash" lbh="0" lbl="0" lb="10" lfd="15" >
<l n="67" cr="f" lc="0xFF9329" ls="flash" lbh="0" lbl="0" lb="10" lfd="15" >
<l n="68" cr="f" lc="0xFF9329" ls="flash" lbh="0" lbl="0" lb="10" lfd="15" >
<l n="69" cr="f" lc="0xFF9329" ls="flash" lbh="0" lbl="0" lb="10" lfd="15" >
<l n="70" cr="f" lc="0xFF9329" ls="flash" lbh="0" lbl="0" lb="10" lfd="15" >
<l n="71" cr="f" lc="0xFF9329" ls="flash" lbh="0" lbl="0" lb="10" lfd="15" >
<l n="72" cr="f" lc="0xFF9329" ls="flash" lbh="0" lbl="0" lb="10" lfd="15" >
<l n="73" cr="f" lc="0xFF9329" ls="flash" lbh="0" lbl="0" lb="10" lfd="15" >
<l n="74" cr="f" lc="0xFF9329" ls="flash" lbh="0" lbl="0" lb="10" lfd="15" >
<l n="75" cr="f" lc="0xFF9329" ls="flash" lbh="0" lbl="0" lb="10" lfd="15" >
<l n="76" cr="f" lc="0xFF9329" ls="flash" lbh="0" lbl="0" lb="10" lfd="15" >
</p>
</s>
```

Figure 11:
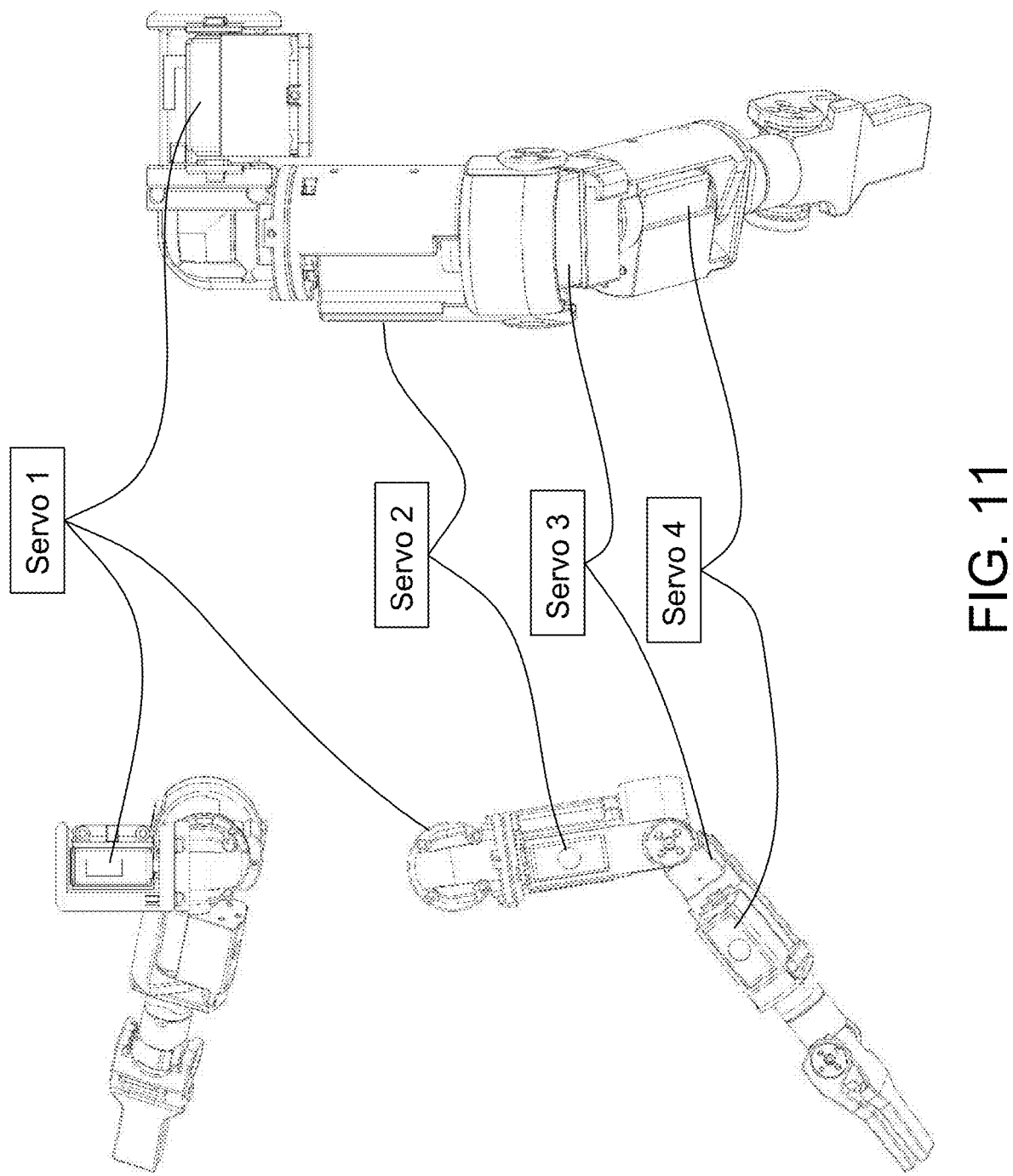
FIG. 11 illustrates an interlocking robotic arm mechanism in accordance with at least one embodiment of the disclosed invention.

FIG. 11 illustrates an interlocking mechanism for the robotic arms in accordance with at least one embodiment of the disclosed. As shown in FIG. 11, the arms of the robotic surrogate may include a highly compact interlocking mechanism for holding at least four servos (e.g., Servo 1, Servo 2, Servo 3, and Servo 4) in relation to each other to achieve at least four degrees of freedom. The mechanism is intended to achieve maximum range of motion in a humanoid arm form factor. The interlocking mechanism may include anti-pinch sensors, or the like.

Figure 12:
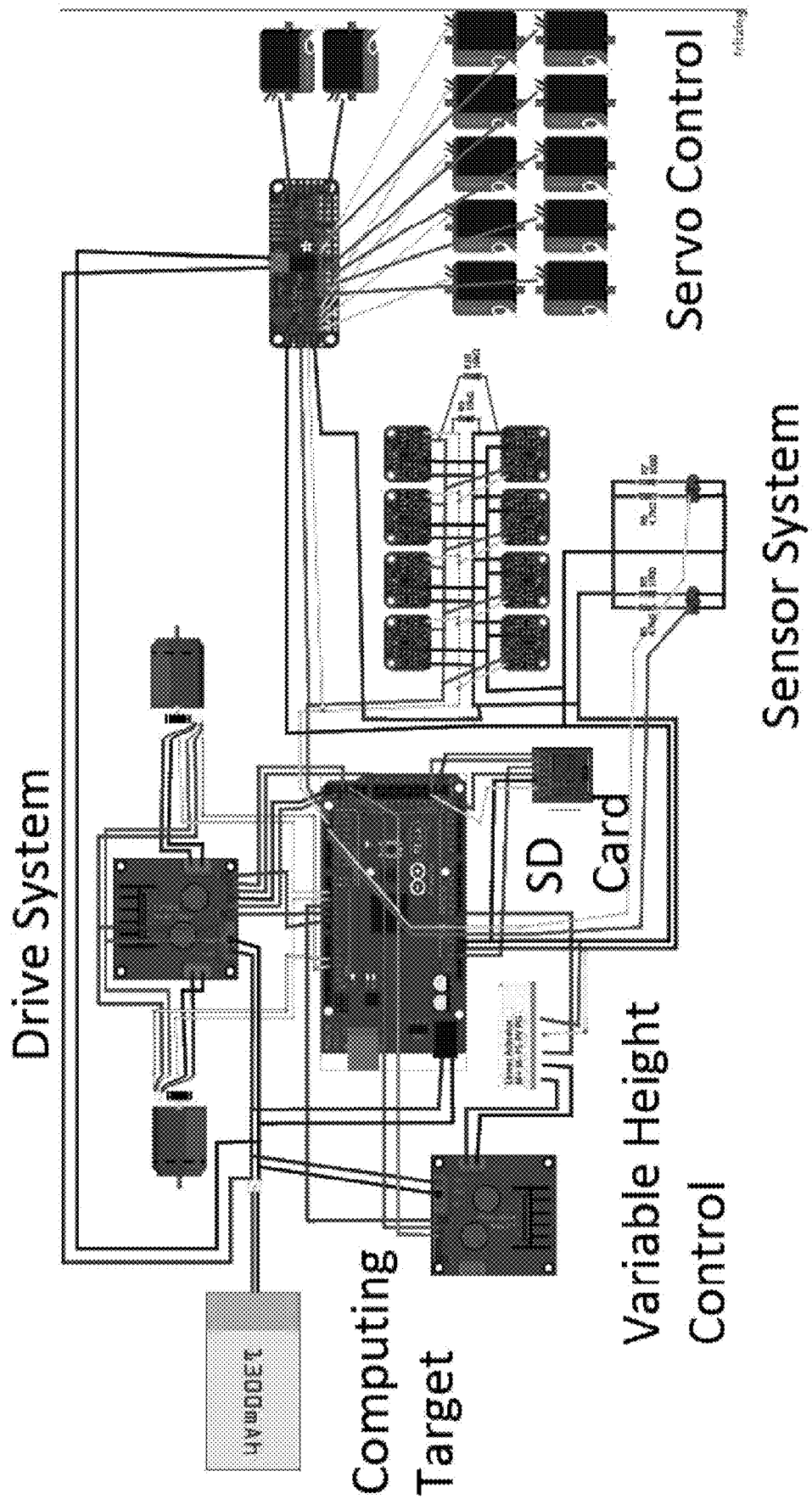
FIG. 12 illustrates an exemplary onboard computer, hardware, and sensors of the robotic surrogate in accordance with at least one embodiment of the disclosed invention.

FIG. 12 illustrates an exemplary onboard computer of the robotic surrogate in accordance with at least one embodiment of the disclosed. For example, the onboard computer may include one or more hardware elements constructed from COTS components. In some embodiments, the hardware elements may be designed to be flexible and expandable to allow further development of the device. In some embodiments, software may be implemented to control all onboard functionality including, but not limited to, drive motors, arm servos, head servos, a variable height mechanism actuator, one or more cliff sensors, and communications with both the main display and the light board. Additionally, or alternatively, software may be designed to be responsive and flexible to allow variable speed motion, ease of motion design, and the ability to adapt to changes in the hardware elements.

Figure 13:
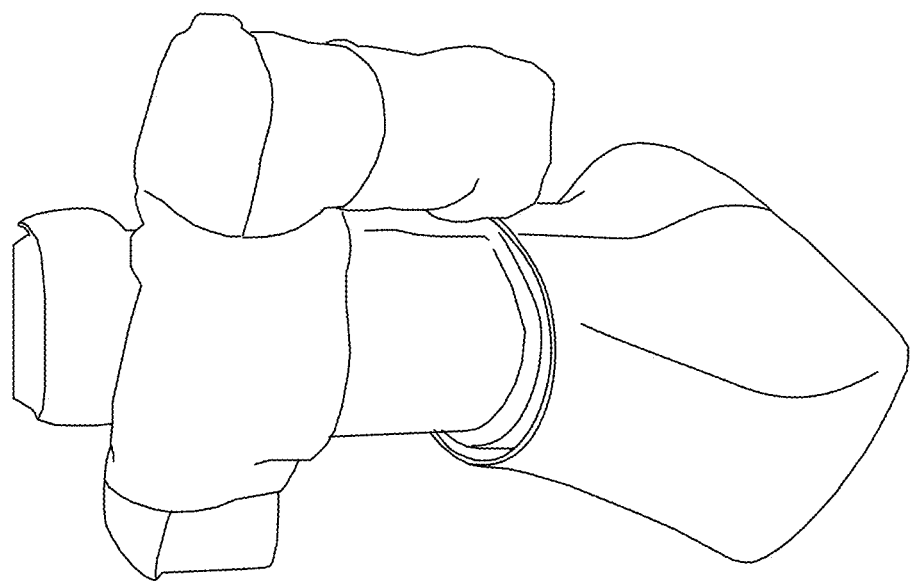
FIG. 13 illustrates an exemplary configuration of the robotic surrogate in accordance with at least one embodiment of the disclosed invention.
Figure 13:
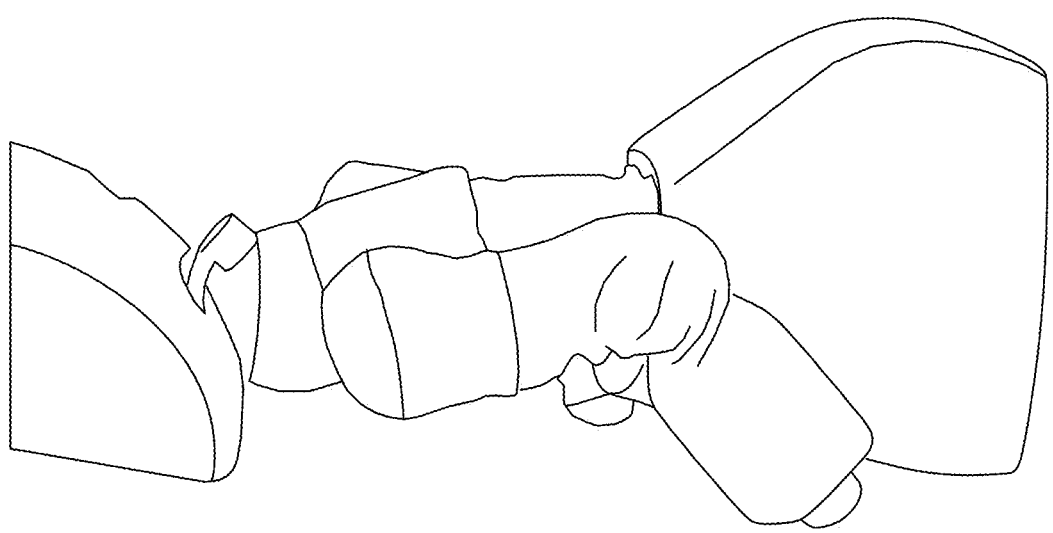

FIG. 13 illustrates an exemplary configuration of the robotic surrogate in accordance with at least one embodiment of the disclosed. For example, the robotic surrogate may be fitted with a soft textile exterior. The soft exterior may increase the robot's touch-ability and reduce the robot's mechanical appearance.

Figure 14:
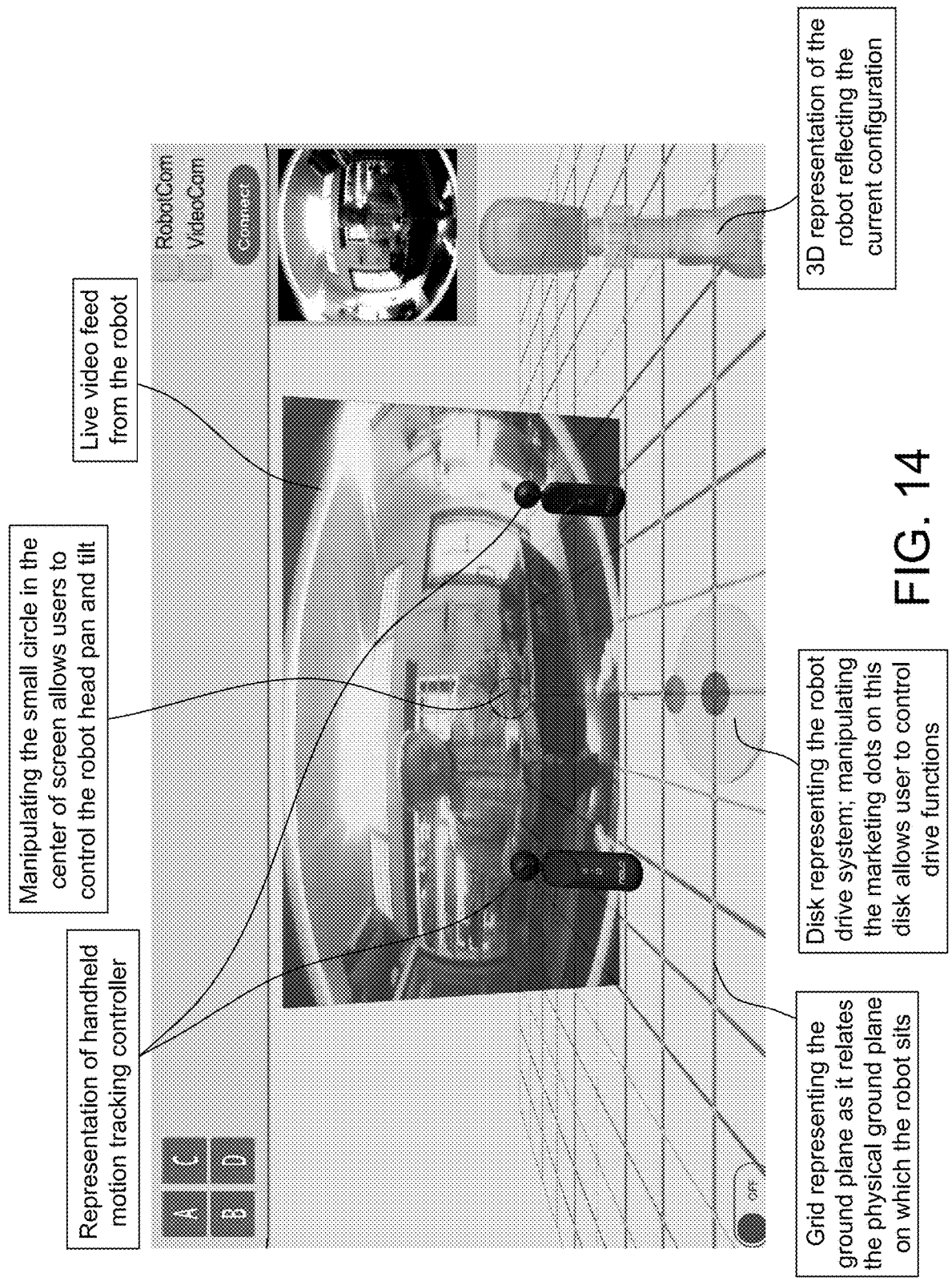
FIG. 14 illustrates a software user interview in accordance with at least one embodiment of the disclosed invention.

FIG. 14 illustrates a software user interface in accordance with at least one embodiment of the disclosed. As shown in FIG. 14, a software user interface may allow all user inputs to be made through one or more handheld controllers which may track three dimensional motion. The software user interface may create a virtual three dimensional environment on screen that may allow users to manipulate various graphical representations using the handheld controllers as they track user hand movements in three dimensional space. As a user manipulates virtual three dimensional objects, one or more commands may be sent to a robotic surrogate to mirror the manipulations. As shown in FIG. 14, graphical elements may be shown representing the handheld motion tracking controllers. A small circle in the center of the screen may allow the user to control the robots head pan and tilt. A live video feed may be provided from one or more cameras installed on the robotic surrogate. Further, as shown in exemplary FIG. 14, a grid may be provided representing a ground plane as it relates to a physical ground plane on which a robot sits. A disk that represents a robot's drive system may be shown. A user may manipulate dots marked on the disk to control drive functions of the drive system. Additionally, a 3-D representation of the robotic surrogate may be provided to reflect the current configuration of the robotic surrogate.

Figure 15A:
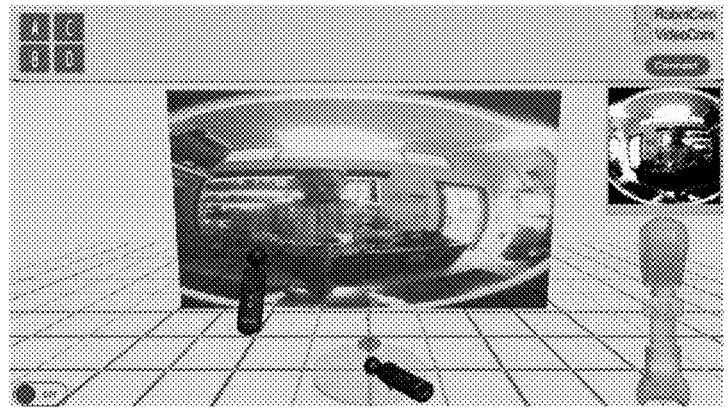
FIGS. 15A-15C illustrate the mapping of drive commands in accordance with at least one embodiment of the disclosed invention.
Figure 15B:
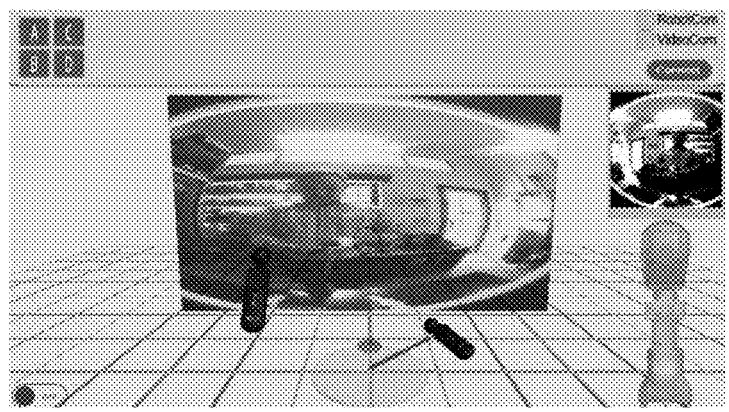
Figure 15C:
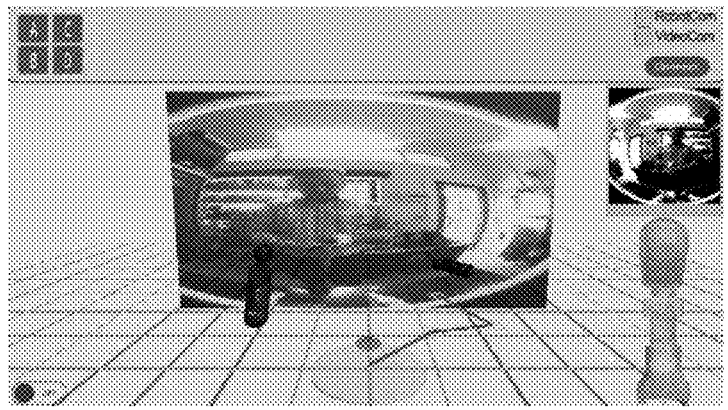

FIGS. 15A-15C illustrate the mapping of drive commands in accordance with at least one embodiment of the disclosed. For example, the software user interface may allow the mapping of drive commands in a three dimensional environment on a two dimensional ground plane utilizing one or more handheld motion tracking controllers and waypoints. The system may allow users to create waypoints utilizing one or more handheld motion tracking controllers that may command the movements of a robotic drive system. Users may create the waypoints on a two dimensional ground plane with may be accurately scaled and perspectively matched to a live video feed from a robot inside the three dimensional user interface. In exemplary FIG. 15A, using a handheld motion tracking controller, a user may move the controller inside the center of a drive circle and pull a trigger button on the controller. This step may grab the base of the robot. In exemplary FIG. 15B, once the user has grabbed the dot representing the base of the robot, the user may drag the dot in the direction they would like the robot to travel. A line may be displayed between the representation of the robot's center and the location of the dot. In this example, the line may represent a vector on which the robot will travel. While the controllers may be able to move in three dimensional space, the movement of the dot may be constrained to movement along a two dimensional ground plane. In exemplary FIG. 15C, the user may be able to place multiple dots, each representing another movement vector which will be executed following the previous. In this example, a user may create a complex sequence of movements for the robot using a series of drag and drop movements.

Figure 16:
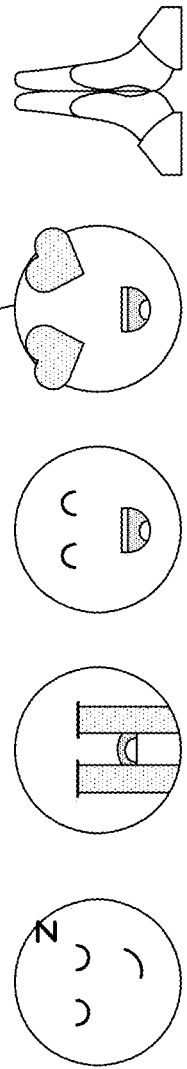
FIG. 16 illustrates another software user interface to transmit emotion display commands in accordance with at least one embodiment of the disclosed invention.
Figure 16:
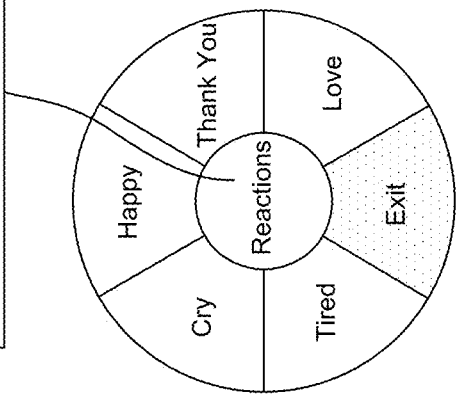

FIG. 16 illustrates software user interface to transmit emotion display commands in accordance with at least one embodiment of the disclosed. The software user interface, in at least one example, may include one or more emotion icons (i.e. emojis, emoticons, etc.) to transmit emotion display commands from a remote user's device to the robotic surrogate. The interface enables users to send one or more commands to a robotic surrogate to display complex behavior. The complex behavior may convey body language of emotion through a single button click. In at least one example, a user may select from an array of icons that may be stylized illustrations of emotional concepts. In response to the selection of the icons, a command may be sent to the robot to activate a script, such as a multidimensional command script, that may include varying the color, intensity, and movement of the lights in the LED arrays, physical movement of the arms and body, variations in sound, or combinations thereof.

It is appreciated that exemplary computing system 100 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

We claim:

1. A computing system, comprising:
at least one robotic surrogate, the at least one robotic surrogate comprising a display; and
at least one computing device of a remote user communicatively coupled to the at least one robotic surrogate, the at least one computing device of the remote user comprising a camera, the at least one computing device configured to:
track one or more movements of a user via one or more sensors;
issue one or more commands based on the tracked movements to the at least one robotic surrogate via at least one network;
issue a series of preconfigured commands based on a single input, wherein the series of preconfigured commands are configured to convey an emotional concept; and
cause to be displayed, on the at least one display of the at least one robotic surrogate a video captured by the at least one camera of the at least one computing device of the remote user.

2. The computing system of claim 1, wherein the at least one robotic surrogate comprises one or more elements including:
a head;
two arms;
a torso; and
a drive system comprising of one or more drive wheels.

3. The computing system of claim 2, wherein at least one or more of the one or more elements move in response to the commands issued by the at least one computing device.

4. The computing system of claim 1, wherein the display is a touchscreen.

5. The computing system of claim 1, wherein the one or more sensors include one or more handheld controllers.

6. The computing system of claim 1, wherein the at least one robotic surrogate comprises of one or more LED lighting arrays.

7. The computing system of claim 6, wherein the one or more LED lighting arrays are configured to display a sequence of lights based on at least one emotion expressed by the user.

8. The computing system of claim 7, wherein the sequence of lights is pre-programmed by the user.

9. The computing system of claim 8, wherein the one or more LED lighting arrays display animations based on sequencing LED assignments.

* * * * *